United States Patent [19]
Airhart

[11] 3,983,900
[45] Oct. 5, 1976

[54] REED VALVES FORMED OF HIGH MODULUS FIBER REINFORCED RESIN

[76] Inventor: Tom P. Airhart, c/o Skyline Industries, Inc., 4909 NE. Parkway, Fort Worth, Tex. 76101

[22] Filed: Dec. 9, 1975

[21] Appl. No.: 639,094

[52] U.S. Cl. .............................. 137/855; 251/368; 137/512.15; 428/902
[51] Int. Cl.² ........................................ F16K 15/16
[58] Field of Search ............ 137/512.15, 525, 525.3; 251/368; 417/563, 564, 565, 566; 428/302, 367, 368, 902; 29/156.7, 157.1

[56] References Cited
UNITED STATES PATENTS

| | | | |
|---|---|---|---|
| 2,722,896 | 11/1955 | Hayes | 417/566 X |
| 2,725,183 | 11/1955 | Hanson | 137/512.15 |
| 3,070,122 | 12/1962 | Weatherhead et al. | 417/564 X |
| 3,200,838 | 8/1965 | Sheaffer | 137/512.15 |
| 3,768,760 | 10/1973 | Jensen | 161/55 |

OTHER PUBLICATIONS

Mount, R. L., *Advanced Filament Composites*, in Machine and Tool Bluebook, pp. 63–71, Nov. 1971.
Marklew, J. J., *Rapid Advances . . . Components* in Machinery and Product Engineering, June 1970.
Berg, K. R., and Filippe, F. J., *Advanced Fiber Resin Composites*, in Machine Design, pp. 160–168, Apr. 1971.
McDonald, J. C., *Carbon Composite Technology*, in Mechanical Engineering, pp. 21–27, Feb. 1971.
Marganite Research and Development Limited, *Modmor High Modulus Carbon Fibers*, Mar. 1969, p. 7, from Engineering Materials and Design Materials Selector.

*Primary Examiner*—William R. Cline
*Attorney, Agent, or Firm*—Dressler, Goldsmith, Clement, Gordon, & Shore, Ltd.

[57] ABSTRACT

Reed valves for an internal combustion engine constituted by a thin flexible flat sheet of fiber-reinforced resin containing from 55-63% by weight of fine diameter fiber, this sheet having a tab portion which is restrained in use to provide a cantilevered flexing portion extending away from said tab portion, the sheet is formed to a thickness in the range of .012 to .020 inch per inch of length of said cantilevered portion, the sheet being constituted by a plurality of layers in each of which the fibers are straight and parallel with one another, with the reinforcing fibers in the outer layers being oriented to run generally from said flexing portion to said tab portion, and with the reinforcing fibers in the inner layers being symmetrically oriented to run in other directions, and the fibers having an average tensile strength above $300 \times 10^3$ p.s.i. and an average modulus of elasticity greater than $18 \times 10^6$ p.s.i., such as is provided by carbon fibers, in order to provide superior response in a thicker than usual reed valve which resists catastrophic failure.

6 Claims, 6 Drawing Figures

REED VALVES FORMED OF HIGH MODULUS FIBER REINFORCED RESIN

This invention relates to reed type valves which are adapted to be used for internal combustion engines and which provide superior properties enabling a given engine to obtain more horsepower from the same displacement or better fuel economy at the same horsepower.

The task of improving reed type valves to where they can outperform the best stainless steel reed valves now available is a formidable one, and I have found that several parameters must be correlated in order to enable fiber-reinforced resins to serve this purpose. In the past, stainless steel reed valves were preferred because they possessed the best mechanical efficiency, but when they failed, the engine containing the same is badly scarred and thereby damaged by the pieces of broken valve. In order to have a reed valve which would not damage the engine if it broke, fabric-reinforced plastic valves have been used, but these are sluggish in performance, and reduce the efficiency of the engine. This invention desires to simultaneously obtain the benefit of a valve which will not damage the engine appreciably in the event of catastrophic failure while improving on the engine performance in comparison with the presently available stainless steel reed valves. Interestingly, to maximize performance with stainless steel, the reed is made as thin as possible, and this aggravates the possibility that fatigue will lead to failure. In this invention, fatigue failure is minimized by using reeds which are significantly thicker than those employed with stainless steel.

In accordance with the present invention, a reed valve for an internal combustion engine is constituted by a thin flexible flat sheet of fiber-reinforced resin containing from 55–63% by weight of fine diameter fiber, this sheet having at least one tab portion which is held to restrain a portion of the valve in use, thereby providing a cantilevered flexing portion which extends away from the tab portion. This thin flat sheet is thicker in this invention than is normal using stainless steel reeds, namely the sheet has a ratio of sheet thickness to the length of the cantilevered portion in the range of 0.012 to 0.020 inch of thickness per inch of length of the cantilevered portion. If the same reed were made of stainless steel, it would have a thickness in the range of 0.008–0.010 inch per inch of length of the cantilevered portion. Moreover, the thin flat sheet in this invention is constituted by a plurality of layers in each of which the fibers are straight and parallel with one another, the reinforcing fibers in the opposite outer layers of the sheet being oriented to run generally from the flexing portion of the tab while the reinforcing fibers in the inner layers are symmetrically oriented to run in other directions. Lastly, the reinforcing fibers have an average tensile strength above $300 \times 10^3$ p.s.i. and an average modulus of elasticity greater than $18 \times 10^6$ p.s.i., such as is provided by carbon fibers, for it is the characteristics of these fibers which has enabled the new and more responsive reed valves of this invention to be designed.

The reed valve in this invention is constituted by a thin flexible flat sheet of fiber-reinforced resin containing from 55–63% by weight, preferably from 57–61% by weight, of fine diameter fiber possessing a high tensile strength, and a high modulus of elasticity as will be detailed hereinafter. The precise diameter of the fiber is of secondary significance, it being well understood that only fine diameter fibers are employed for reinforcing resins, and that these are to be used herein. On the other hand, the proportion of fiber in the fiber-resin composite can vary considerably, but not for the production of the superior reed valves which are the subject of this invention. It is only within the narrow range of from 55–63% by weight fiber, preferably from 57–61% by weight, that one is able to employ the high modulus fibers under consideration and obtain a superior response in internal combustion engines.

Appropriate resins may vary considerably, but these are preferably thermosetting resins which cure on the application of heat to provide hard and tough resin matrices. The usual commercial resins for fiber reinforced laminates are epoxy resin systems, and these are preferably used herein. These epoxy resin systems can be cured either with acid or alkaline curing agents, and both types of curing systems are well known. The bisphenol-based diglycidyl ethers are preferably employed having an epoxy equivalent weight in the range of 150–600. Typical alkaline curing agents are illustrated by dicyandiamide. Typical acid curing agents are illustrated by phthalic acid or anhydride. The curing agents are used in stoichiometric proportions ± 25 percent. Other thermosetting resins are illustrated by commercially available organic solvent-soluble polyimides. Even thermoplastic resins, such as high melting fluorine-containing addition polymers illustrated by polytetrafluorethylene can be used. The point to be observed is that the high modulus fibers become chemically bonded into a resin matrix and the resin matrix itself, while relatively hard and tough, is totally incapable of supporting the loads which are imposed upon the thin flexible flat sheet which is to constitute the reed valve of the present invention.

The fibers which are utilized in this invention are primarily illustrated by fibers of carbon. Speaking generically, the fibers should have an average tensile strength above $300 \times 10^3$ p.s.i., and an average modulus of elasticity greater than $18 \times 10^6$ p.s.i. Commercially available carbon fibers customarily have these properties, but it is also possible to find such properties in boron fibers. Glass is not satisfactory since its modulus of elasticity is too low. Similarly, metals generally have much too low a modulus of elasticity to provide the mechanical interrelationship which is necessary to provide the instantaneous response which is needed in order to improve the operation of internal combustion engines in accordance with this invention.

Turning now to the structure of the reed valve, reed valves are known in various configurations, but they all have in common a tab portion which is held to restrain the valve in use, and a cantilevered flexing portion which extends away from the tab portion. This cantilevered portion is intended to flex in use, and it is the flexure of the sheet along its cantilevered length which serves to open and close the valve of the internal combustion engine.

As will be immediately evident, the more instantaneous the flexure response to the reed valve, the better the operation of the engine.

Superior engine operation can be observed in various ways. Thus, a given engine can be made to operate to provide a given horsepower with less fuel than would be consumed by the same engine operating to deliver the same horsepower, but using the conventional stainless steel reed valve. On the other hand, the engine can be operated so that it consumes the same amount of fuel as would be consumed by the same engine embodying the conventional stainless steel reed valve, but now the engine is able to operate to deliver more horsepower.

The increased operating efficiency measured in additional horsepower at the same fuel consumption is usually at least 5 percent, and more frequently is in the range of from 10–15 percent.

A key feature in this invention is the correlation between the thickness of the sheet and the cantilevered length. As previously pointed out, when the reed valve was constituted by a thin sheet of stainless steel, the sheet was made as thin as possible because the thinner sheet was more responsive, so the best engine performance was obtained with the thinnest stainless steel sheets. Unfortunately, and as previously pointed out, these very thin sheets can sometimes break, and the broken pieces would damage the operating engine. In this invention, the sheets are thicker than heretofore, and significantly thicker. Thus, where the conventional stainless steel reed valves have a thickness in the range of 0.008 – 0.010 inch per inch of length of the cantilevered portion, the reed valves of this invention should have a thickness in the range of 0.012 to 0.020 inch of thickness per inch of length of the cantilevered portion. The preferred range of thickness is from 0.013–0.019 inch, on the same basis.

While the fabric reinforced plastic reed valves previously used have been less mechanically efficient than the stainless steel reed valves, by properly constructing the reed valve utilizing high modulus fibers as described hereinbefore and employing sheet thicknesses which are greater than used with stainless steel, the result is superior mechanical performance rather than the inferior mechanical performance previously encountered.

It should be observed that the stainless steel in the prior art valve has the same properties in every direction, but this is not obtained in fiber reinforced composites. As a result, and in this invention, the thin flexible flat sheet is formed by the consolidation of a plurality of fiber-reinforced layers, the fibers in each of the layers being straight and parallel with one another. This is important because it is the fibers which must bear the load, and bear it instantaneously. Thus, woven fabrics are useless in this invention.

In order to construct the thin flexible flat sheet from the fiber layers which have been described, the opposite outer layers are disposed so that the straight parallel reinforcing fibers are oriented to run generally from the flexing portion of the valve to the tab portion of the valve. Then, in addition to these opposite outer layers, the sheet must also include inner layers between the outer layers. The reinforcing fibers in these inner layers are symmetrically oriented to run in directions other than the fiber direction of the outer layers. It will be understood that it is permissible for these inner layers to also include one or more layers in which the reinforcing fibers are parallel to the fiber direction in the outer layers.

When all of the expedients described hereinbefore are utilized in combination, one obtains a reed valve which is resistant to catastrophic failure, and which is more mechanically responsive then the best of the stainless steel reed valves previously available.

The invention will now be described in connection with the accompanying drawings, in which:

FIGS. 1 and 2 diagrammatically illustrate a two cycle internal combustion engine employing a reed valve and showing the manner in which the reed valve operates;

Figure 1:
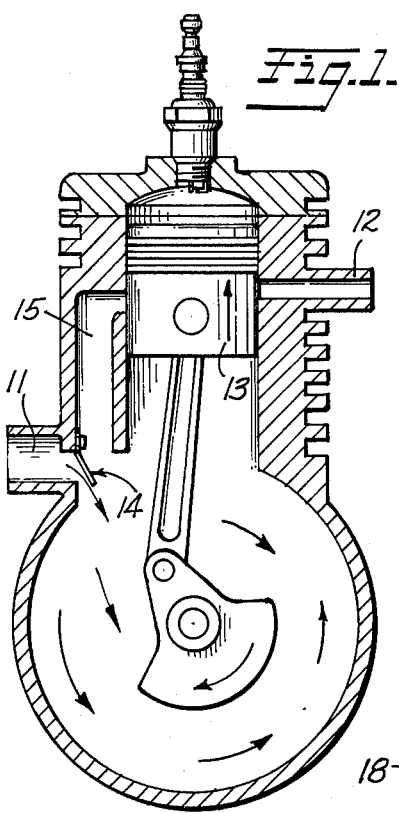
Figure 2:
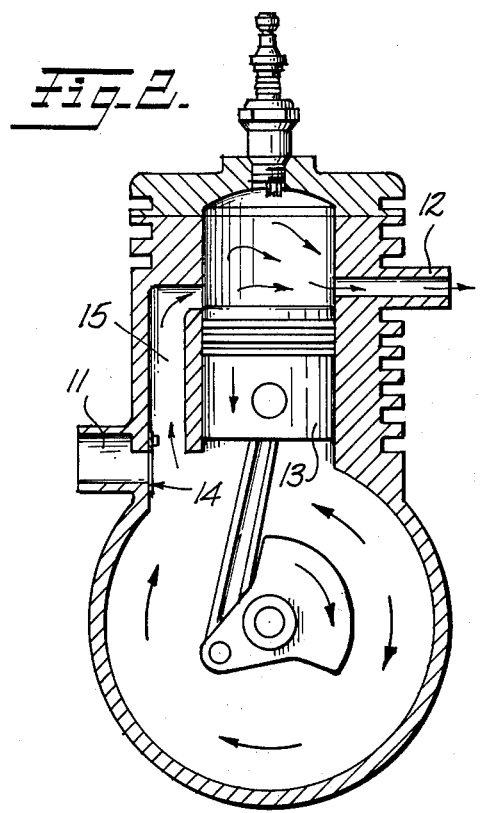

Referring more particularly to the drawings, the two cycle internal combustion engine pictured in FIGS. 1 and 2 is quite conventional, the engine including an inlet port 11 and an outlet port 12. In FIG. 1 the piston 13 moves upwardly in the cylinder which surrounds it, and this creates a vacuum in the space below the piston which flexes the reed valve 14 into the open position shown in FIG. 1 to allow a fuel-air mixture to enter the inlet 11. Shifting to the portion of the cycle shown in FIG. 2, the piston 13 has moved down to an exhaust position, and this also uncovers a passageway 15 which increases the pressure in the space below the piston and this causes the reed valve to flex and close the inlet 11. At the same time, some of the fuel moves into the cylinder to charge the cylinder for the following cycle.

As will be evident, the reed valve 14 must flex instantly, or the engine will operate at reduced efficiency.

Figure 3:
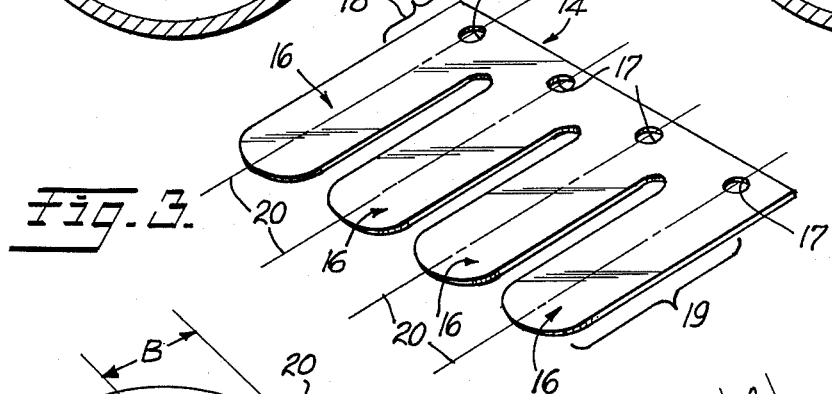
FIG. 3 is a perspective view illustrating a typical reed valve employing a plurality of flexible reed portions for use in a two cycle internal combustion engine.

Referring to FIG. 3, the illustrative reed valve is formed with a plurality of cantilevered flexing portions 16 which can be referred to as fingers. These extend downwardly and to the left in the drawing, the reed valve being held in the engine by securements which extend through openings 17. In this way, we form a tab portion 18 and a cantilevered portion 19 which, in the form illustrated, has a length of 1.5 inches.

Figure 4:
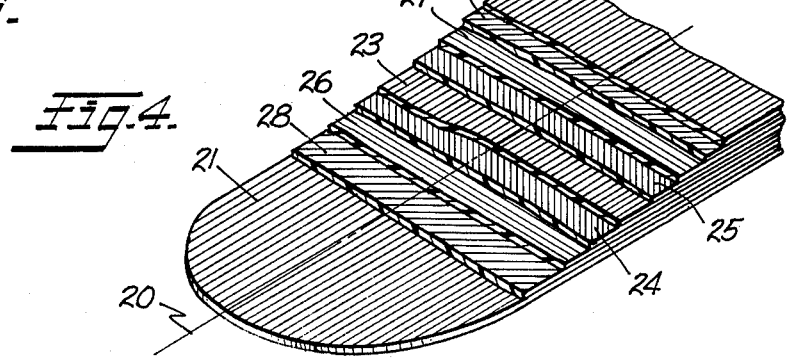
FIG. 4 is an enlarged view of the outer extremity of one of the reed portions shown in FIG. 3, with the layers broken away to reveal the internal fiber structure.

The detailed structure is shown in FIG. 4 where it will be seen that each of the cantilevered portions 16 is formed of a plurality of layers consolidated together into a cured laminate and the primary axis 20 of the cantilevered portion 16 can be seen to be parallel to the predominant fiber direction in the opposite outer plies 21 and 22. Most of the remaining plies, except for the central ply 23 have their fibers extending in other directions, and these are symmetrically arranged, the two plies 24 and 25 on opposite sides of the central ply 23 having their fibers at an angle of +45° with respect to the primary axis 20, the next two plies 26 and 27 having their fibers at an angle of 90° to the primary axis 20. The next two plies 28 and 29 have their fibers at an angle of −45° with respect to the primary axis 20.

The result is a nine ply laminate which, in the preferred practice of this invention, would have a thickness in the range of from 0.023–0.027 inch.

Figure 6:
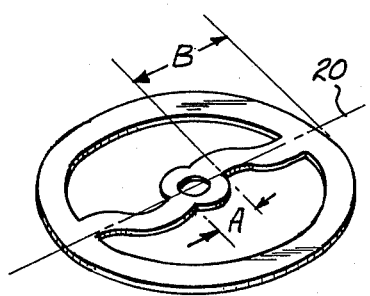
FIG. 6 shows a more complex form of reed valve in which the tab portion is centrally located.
Figure 5:
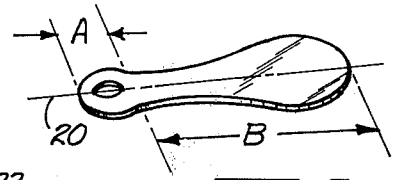
FIG. 5 shows a simplified reed valve structure which employs a single tab portion and a single cantilevered flexing portion.

FIGS. 5 and 6 illustrate other reed valve shapes. As can be seen in both of these figures, the tab portion is identified by the letter A, and the cantilevered flexing portion is identified by the letter B. The single finger construction shown in FIG. 5 would be used to cover a single intake port whereas the structure shown in FIG. 3 illustrates each of the four fingers 16 covering a separate intake port. The structure shown in FIG. 6 would be used to cover an annular port.

The invention will be illustrated by the formation of a reed valve useful in an outboard marine engine, this reed valve having the structure shown in FIG. 3, and being constituted by a flat thin sheet having a thickness of approximately 0.235 inch and a cantilevered length of 1.5 inch (providing a ratio of approximately 0.0167 inch of thickness per inch of cantilevered length).

The sheet is made by superimposing 9 plies of epoxy resin-impregnated straight parallel carbon fiber tows (untwisted rovings) bound together with about 50% by weight of alkaline catalyzed epoxy resin in a tacky B stage.* The rovings used in this example are available in commerce under the trade designations HTS from Hercules, Inc., the individual fibers having a tensile strength of $350 \times 10^3$ p.s.i. and a modulus of elasticity in the range of $36-42 \times 10^6$ p.s.i. These tacky plies are superimposed, one above the other, with alternating (symmetrical) fiber alignment as shown in FIG. 4, and the composite is cured between pressure platens with heat and pressure using a layer of dry fiber glass above the composite to absorb the excess resin which is squeezed out of the laminate using a pressure of 80 p.s.i. This leaves about 57.5% by weight of fiber, balance resin, in the superimposed layers forming the cured laminate. The composite is cured by placing it, while under the noted pressure, in an oven maintained at 350°F. for approximately 2½ hours. In this way, the resin flows to form a bubble-free laminate, the epoxy resin thermosets, and the proportion of fiber in the laminate is regulated to be within the range found to be necessary. The resulting product is a hard, thin flat sheet with the epoxy resin being in a thermoset condition.

* 1 part diglycidyl ether of bisphenol A (epoxy value 0.5) mixed with 5 parts of another diglycidyl ether of bisphenol A (epoxy value 0.2) and 4 parts of dicyandiamide applied to the roving from solution in methylene chloride.

Reed valves are formed from the sheet by simply stamping the part, making sure that the axis of the flexing cantilevered portion of the valve is in line with the fiber direction in the opposite outer plies of the laminate. The stamped edges are then ground so as to eliminate any microscopic cracks or fissures therein. It is stressed at this point that grinding is helpful to the durability of the reed valves because it heals imperfections which are not visible to the naked eye, but which can lead to catastrophic failure under operating conditions.

The invention is defined in the claims which follow.

I claim:

1. A reed valve for an internal combustion engine constituted by a thin flexible flat sheet of fiber-reinforced resin containing from 55–63% by weight of fine diameter fiber, said sheet having at least one tab portion which is held to restrain a portion of the valve in use, thereby providing a cantilevered flexing portion extending away from said tab portion, said sheet having a ratio of sheet thickness to the length of said cantilevered portion in the range of 0.012 to 0.020 inch of thickness per inch of length of the cantilevered portion, said sheet being constituted by a plurality of layers in each of which the fibers are straight and parallel with one another, the reinforcing fibers in the opposite outer layers of said sheet being oriented to run generally from said flexing portion to said tab portion, said sheet including inner layers between said outer layers in which the reinforcing fibers are symmetrically oriented to run in other directions, and said fibers having an average tensile strength above $300 \times 10^3$ p.s.i. and an average modulus of elasticity greater than $18 \times 10^6$ p.s.i.

2. A reed valve as recited in claim 1 in which said fibers are carbon fibers.

3. A reed valve as recited in claim 1 in which said sheet has a thickness of from 0.013 – 0.019 inch per inch of length of the cantilevered portion.

4. A reed valve as recited in claim 1 in which said sheet contains from 57–61% by weight of carbon fibers.

5. A reed valve as recited in claim 1 in which said resin is an epoxy resin.

6. A reed valve as recited in claim 1 in which said reed valve is stamped from a cured laminate providing said thin flexible flat sheet, and the stamped edges are ground to heal microscopic imperfections.

* * * * *

UNITED STATES PATENT OFFICE
CERTIFICATE OF CORRECTION

PATENT NO. : 3,983,900
DATED : October 5, 1976
INVENTOR(S) : Tom P. Airhart

It is certified that error appears in the above–identified patent and that said Letters Patent are hereby corrected as shown below:

Column 5, line 7, "0.235" should be -- 0.025 --.

Signed and Sealed this

Twenty-eighth Day of December 1976

[SEAL]

Attest:

RUTH C. MASON
*Attesting Officer*

C. MARSHALL DANN
*Commissioner of Patents and Trademarks*